D. SERVIS,

Assignor, by mesne assignments, to THE SERVIS RAILROAD TIE PLATE COMPANY.

WEAR PLATE FOR RAILROAD TIES.

No. 10,302. Reissued Apr. 3, 1883.

Attest:

Geo. H. Graham

T. H. Palmer

Inventor,

David Servis, by Munson & Philipp

Attys.

BEST AVAILABLE COPY

UNITED STATES PATENT OFFICE.

DAVID SERVIS, OF SENNETT, ASSIGNOR, BY MESNE ASSIGNMENTS, TO THE SERVIS RAILROAD TIE PLATE COMPANY, OF NEW YORK, N. Y.

WEAR-PLATE FOR RAILROAD-TIES.

SPECIFICATION forming part of Reissued Letters Patent No. 10,302, dated April 3, 1883.

Original No. 249,407, dated November 8, 1881. Application for reissue filed December 27, 1882.

*To all whom it may concern:*

Be it known that I, DAVID SERVIS, formerly of the city, county, and State of New York, but now residing at Sennett, in the county of Cayuga, in said State, have invented a new and useful Improvement in Wear-Plates for Railroad-Ties, of which the following is a specification.

Figure 1:
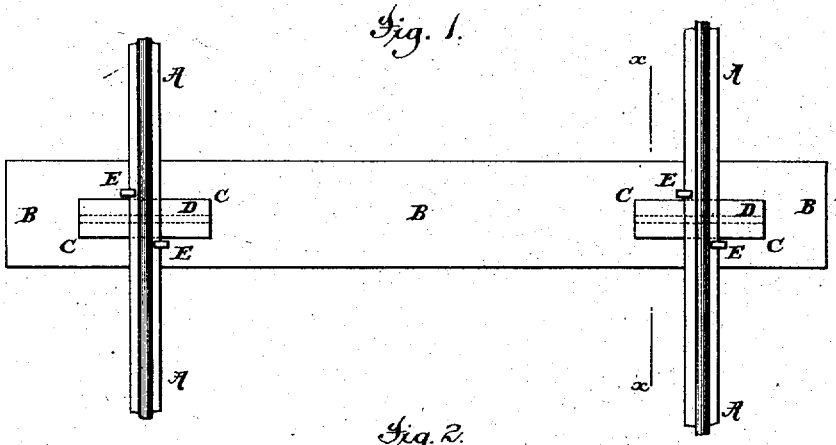
Figure 2:
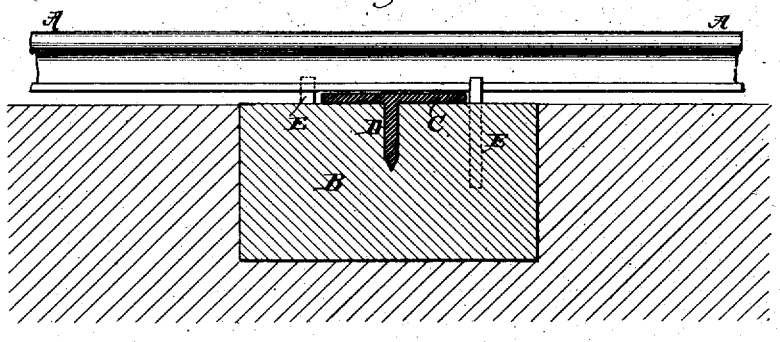
Figure 3:
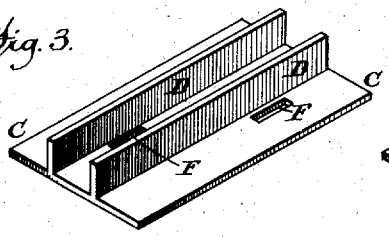
Figure 4:
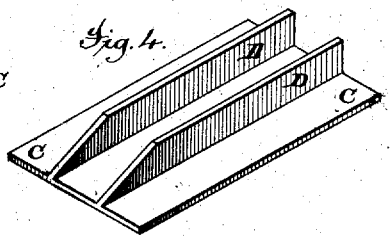

Figure 1 is a plan view of my improvement, illustrating its use. Fig. 2 is a sectional elevation of the same, taken through the line $x\,x$, Fig. 1. Figs. 3 and 4 are perspective views of modifications of the improvement shown inverted.

Similar letters of reference indicate corresponding parts.

The object of this invention is to increase the durability of railroad-ties.

In the accompanying drawings, A represents a railroad-rail, and B is a tie, sleeper, or other timber upon which the rail A rests.

C is an iron plate of any convenient width, and of such a length as to pass beneath the base of a rail, A, and project at both ends beyond the said rail, as shown in Fig. 1. Upon the lower side of the plate C are formed one or more flanges, D, which are made thin, so that they can be driven into the tie or sleeper B lengthwise of the grain of the wood without splitting or otherwise materially affecting the timber. The plates C are designed to be made of such a width that they will pass between the spikes E, that secure the bases of the rails to the ties or sleepers; or the plates C can be made wider, as shown in Fig. 3, in which case slots or notches F can be formed in the said plate C, as shown in Fig. 3, to receive the spikes E. When the plates C are to be applied to the ties or sleepers B before they are laid, or before the rails A are spiked to them, the flanges D can be made rectangular or with square ends, as shown in Fig. 3. When the wear-plates C are to be applied to ties or sleepers B to which the rails have already been spiked the flanges D are rounded or beveled at one end, as shown in Fig. 4, so that the end of the plate C can be entered between the base of the rail and the tie or sleeper, and the plate then driven into place, the flanges D readily forcing their way into the timber. With this construction the plates C prevent the base of the rail from wearing and cutting the grain of the wood, and thus destroying the ties or sleepers, so that soft wood can be used for ties and sleepers, and will last until destroyed by decay. With this construction, also, the flange or flanges D strengthen the plates C, so that the said plates can be made light, and so that a pressure upon the rails will not bend or curve the plates, the said pressure putting the said flanges under a tensile strain, which firmly resists the tendency of the plates to bend.

Having thus fully described my invention, I claim as new and desire to secure by Letters Patent—

1. A wear-plate for railroad-ties, consisting of a short plate of metal, provided with a projecting flange or flanges, D, said plate being adapted to operate as a rail-seat, and its flange or flanges to support the same by being entered into the tie longitudinally or lengthwise of the grain of the tie, all substantially as described.

2. The combination, with a railroad-rail and supporting cross-tie, of a metal wear-plate consisting of a body having one or more projecting flanges, said plate being interposed between the rail and tie, with its flange or flanges entered into the tie longitudinally or lengthwise of the grain of the wood composing the tie, substantially as described.

3. In a wear-plate for railroad-ties, the flange or flanges D, formed upon the lower side of the plate C, and beveled or rounded at one end, substantially as herein shown and described, to adapt the wear-plate to be driven in between a rail and a tie or sleeper without displacing the said rail, as set forth.

In testimony whereof I have hereunto subscribed my name in presence of two subscribing witnesses.

DAVID SERVIS

Witnesses:
H. T. M[illegible]
T. H. PALMER